March 11, 1952  C. FUHRMEISTER, JR  2,588,976
FILTER
Filed Nov. 6, 1946   5 Sheets-Sheet 2
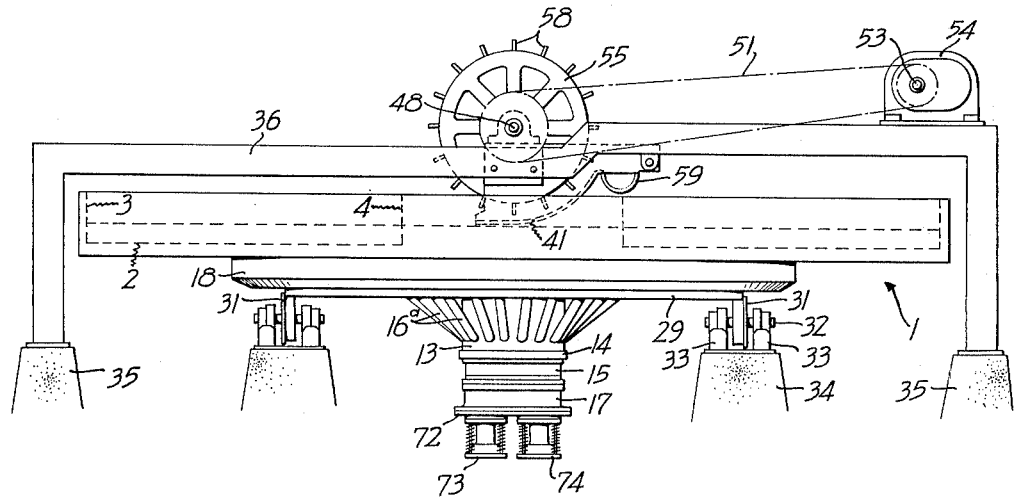
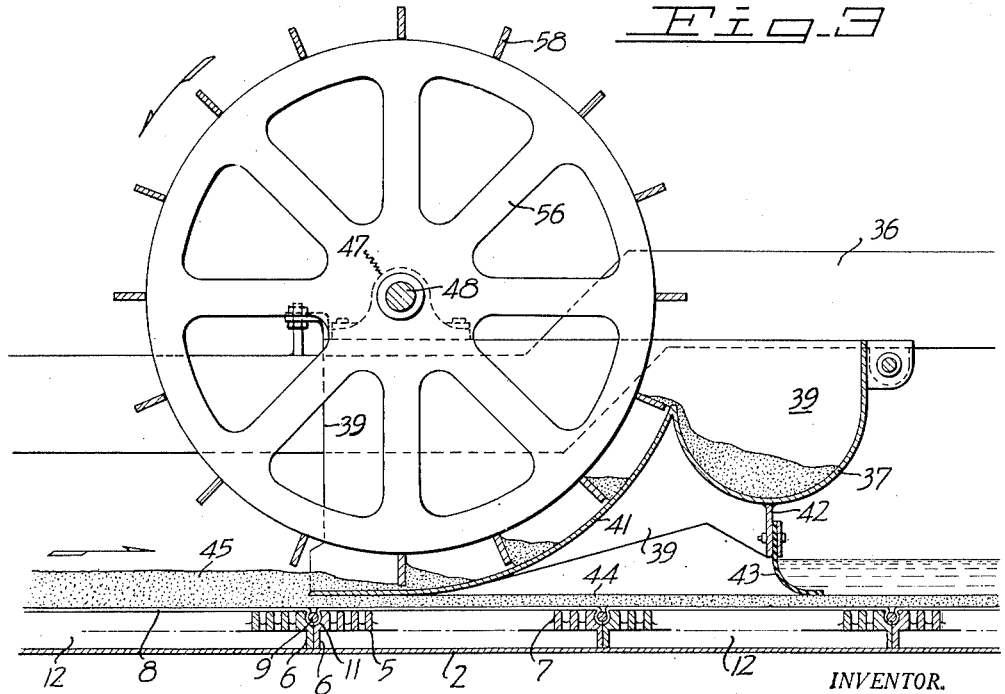
INVENTOR.
CHARLES FUHRMEISTER, JR.
BY
His Attorney March 11, 1952  C. FUHRMEISTER, JR  2,588,976
FILTER
Filed Nov. 6, 1946  5 Sheets-Sheet 3
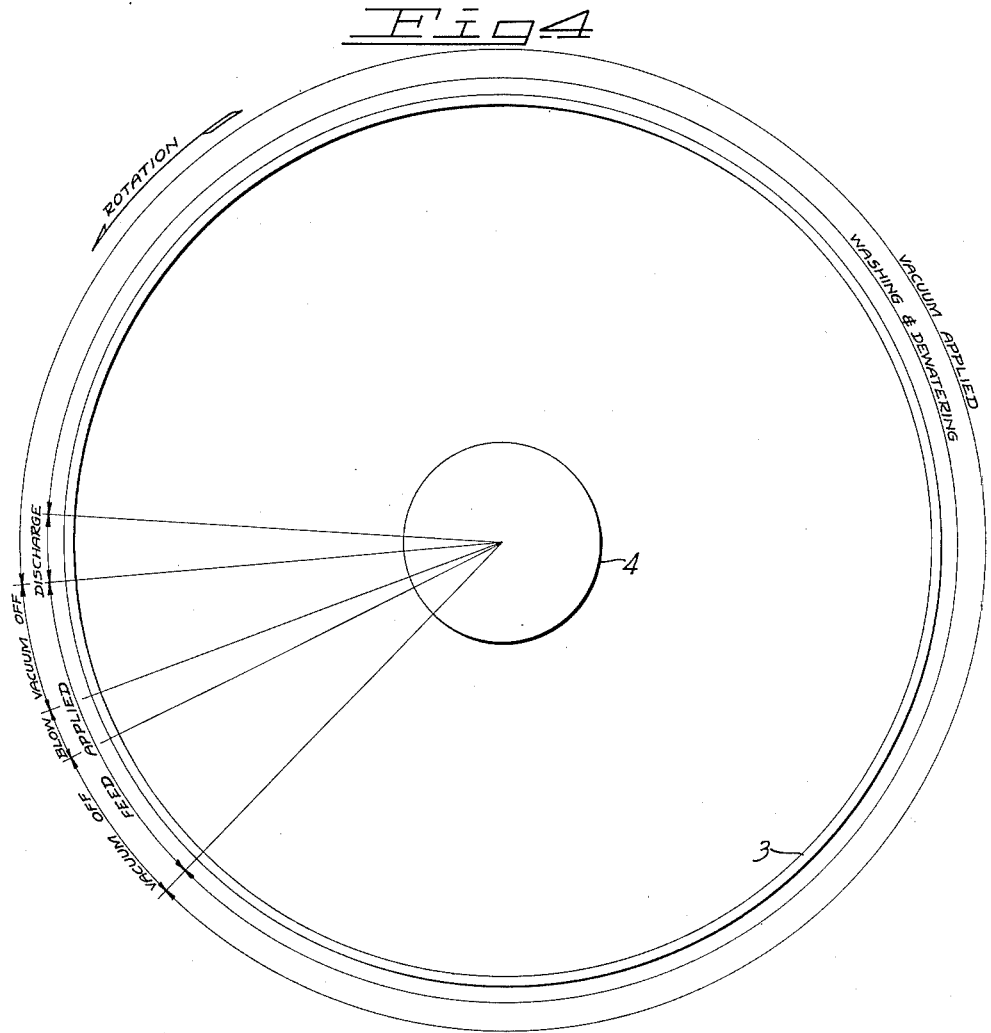
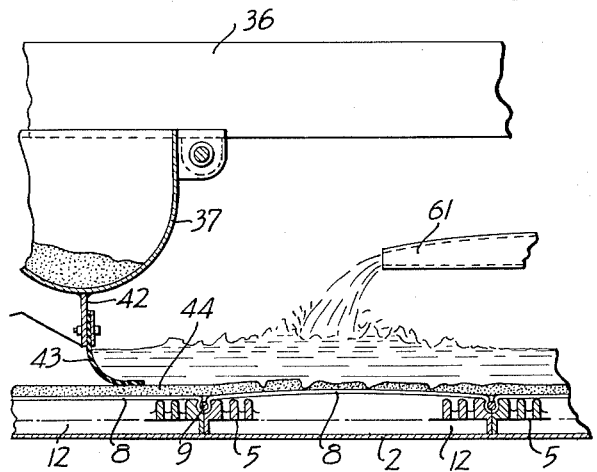
INVENTOR.
CHARLES FUHRMEISTER, JR.
BY
His Attorney March 11, 1952  C. FUHRMEISTER, JR  2,588,976
FILTER
Filed Nov. 6, 1946  5 Sheets-Sheet 5
_Fig_7
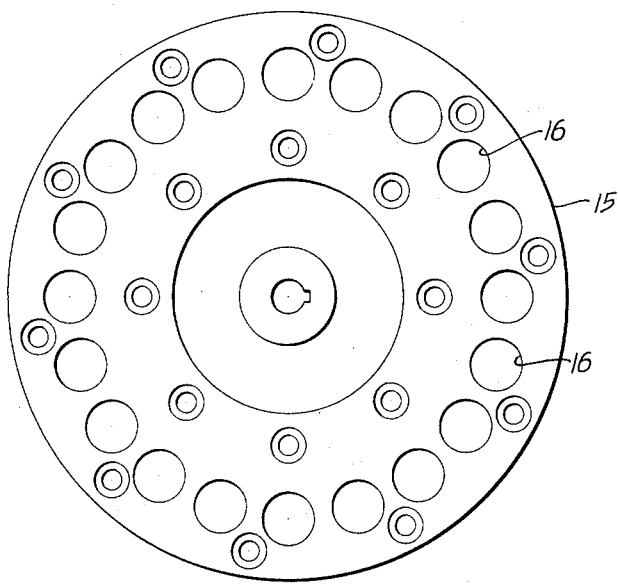
_Fig_8
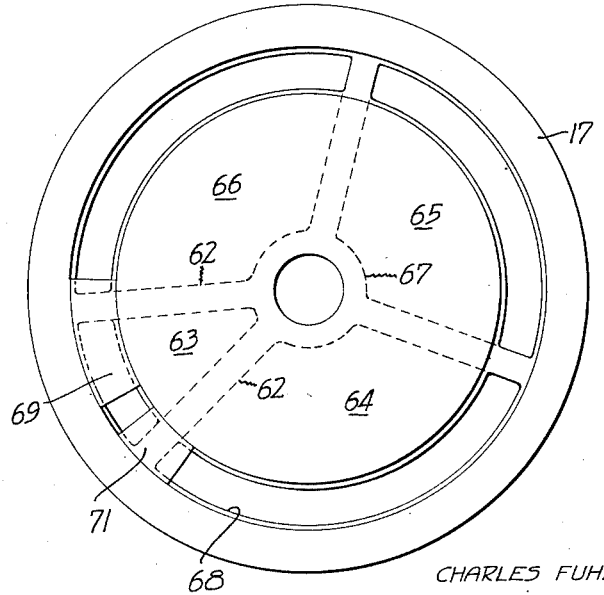
INVENTOR.
CHARLES FUHRMEISTER, JR.
BY Mellin and Hanscom
His Attorney Patented Mar. 11, 1952

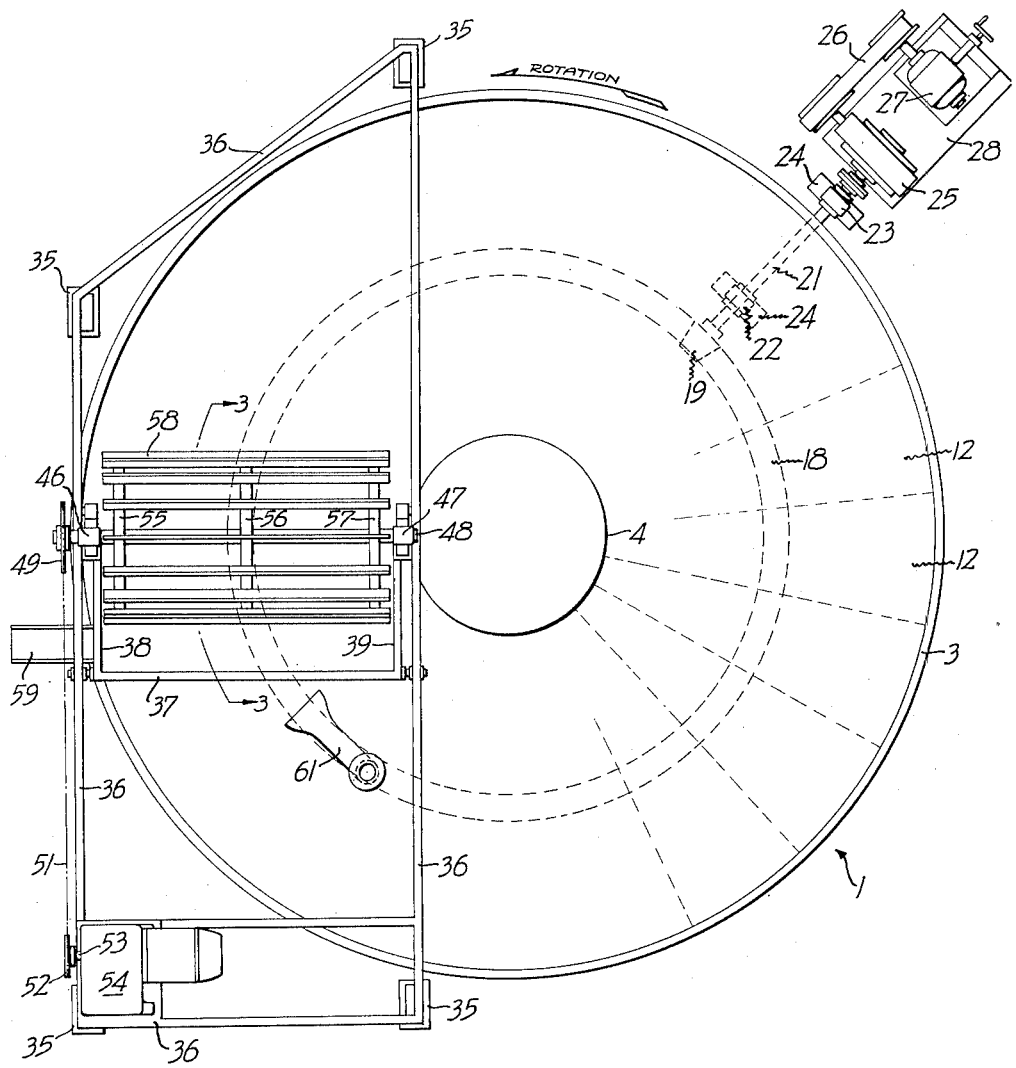

2,588,976

UNITED STATES PATENT OFFICE 2,588,976

FILTER

Charles Fuhrmeister, Jr., Maplewood, N. J., assignor to Oliver United Filters Incorporated, Oakland, Calif., a corporation of Nevada Application November 6, 1946, Serial No. 708,039

4 Claims. (Cl. 210—202.5)

This invention relates in general to continuous filters, and more specifically to a rotary table type of filter such as is exemplified in the Oliver U. S. Patent No. 1,335,695, issued on the 30th day of March, 1920.

To obtain economical operation of a continuous filter it is necessary that the cake formed thereon be completely removed once during each cycle of operation of the filter, for otherwise the filter medium becomes clogged with the result that sustained operation becomes impossible. Normally, in a table type of filter the cake is successively removed from each of the filtrate compartments by a scroll disposed radially above the table at the discharge station. Since the scroll must be definitely spaced from the filter medium to avoid wear thereof and injury thereto, a substrata of the cake is permanently left on the filter medium. As operation of the filter continues, this substrata of cake becomes compacted to a point where filtration can no longer proceed at an economical rate.

In general the object of this invention is the provision of the process and means whereby the substrata of the cake normally left on the filter medium below the level of the discharge scroll can be re-pulped with the slurry fed to the table at the feed station, thereby to avoid the formation of a compacted substrata.

More specifically, the object of the invention is the provision of a table type filter provided with an automatic filter valve so bridged that the residual substrata of cake remaining after discharge can be subjected to a blow-back or reverse pressure at the feed zone whereby the residual substrata of cake is lifted from the filter medium and simultaneously re-pulped with the slurry being flowed onto the table at this point.

A further object of the invention is the provision of a table type filter wherein the discharge of the major upper portion or strata of the cake is effected by a paddle wheel discharger, this type of discharger having been found to be particularly effective in handling the filter cake resulting from the filtration of wet phosphoric acid slurries.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings,

Fig. 1 is a top plan view of a table type filter embodying the objects of my invention.

Fig. 2 is a left hand side elevation of the filter illustrated in Fig. 1.

Fig. 3 is an enlarged fragmentary section taken on the section line 3—3 of Fig. 1.

Fig. 4 is a diagram showing the cycle of operation of the filter and its automatic valve.

Fig. 5 is an enlarged detail section taken through one of the filtrate compartments during the time that a reverse pressure or blow-back is being applied thereto for the purpose of re-pulping the residual substrata of the cake supported thereon.

Fig. 7 is a bottom plan view of the wear plate forming an integral part of the stationary portion of the automatic filter valve.

Fig. 8 is a top plan view of the valve body shown in Figs. 2 and 6.

Figure 6:
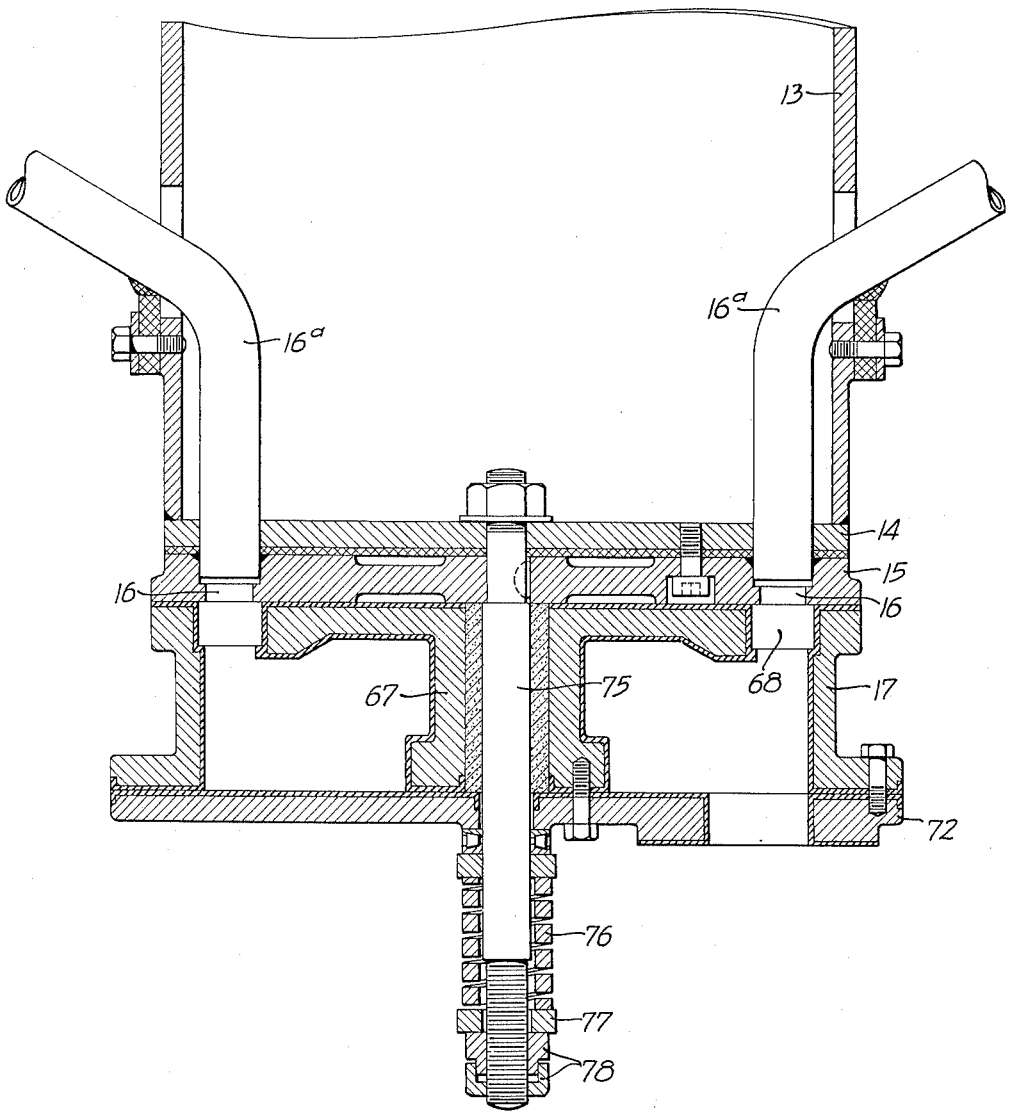
Fig. 6 is a vertical section taken through the automatic filter valve illustrated in Fig. 2.

The table filter as shown in these various figures includes an annular pan 1 defined by a bottom 2 and outer and inner circular walls 3 and 4, welded thereto. Disposed within the pan 1 are a plurality of segmental drainage screens 5 provided on their lower radial edges with downwardly extending supporting flanges 6 and on their upper surfaces with radially disposed ribs 7. The radial flanges 6 serve to space the ribs 7 from the pan bottom 2. Disposed over the upper surfaces of the drainage screens 5 is a filter medium 8 secured in place by caulking rods 9 accommodated in semicircular recesses 11 defined by the adjacent radial edges of the drainage screens 5. The structure so far described therefore constitutes an annular pan divided into a plurality of independent contiguous and segmental filtrate compartments, sections or elements 12.

Welded to and supported by the pan bottom 2, co-axially therewith, is a valve pipe 13 closed at its lower end by a pipe plate 14. Bolted to the pipe plate 14 is a wear plate 15, both the pipe plate and wear plate being provided with a circular ring of longitudinally extending and aligned holes 16, there being one pair of longitudinally aligned holes for each of the filtrate compartments 12. Operatively associated with the wear plate 15 is a valve body 17 the details of which will be presently described. Communicating with each of the filtrate compartments 12 and one pair of aligned holes 16 formed in the pipe and wear plates is a filtrate pipe 16a, the lower end of which extends through the pipe or sleeve 13.

Fastened to the lower face of the pan bottom 2 is a ring gear 18 arranged to mesh with a pinion 19 carried on the end of a radially extending shaft 21. The shaft 21 is journaled in bearings 22 and 23 mounted on a stationary frame 24. The shaft 21 is driven through suitable gears located in a gear housing 25 and through a variable speed drive 26 by a motor 27 carried by a frame 28.

Fastened to the inner side of the ring gear 18 is a circular rail 29 arranged to travel on trunnion wheels 31, these trunnion wheels being mounted on shafts 32 supported on a pair of spaced pillow blocks 33. The pillow blocks 33 are in turn mounted on concrete piers 34. It will therefore be seen that when the shaft 21 is driven by the motor 27 the table 1 will be caused to rotate on the trunnion wheels 31 about the axis of the table, all in accordance with well-known standard practice.

Mounted on piers 35 over the left side of the table as shown in Fig. 1 is a frame 36, and pivoted between and to the side members of the frame 36 intermediate its ends is a trough 37, this trough including opposed side members 38 and 39. Formed integral with and as an extension of the trough 37 is a rigid arcuate lip 41, the forward end of this lip being parallel with the filter medium 8 and spaced therefrom a sufficient distance to preclude any chance of its contact with the filter medium. Welded across the lower edge of the trough 37 is a rib 42 and bolted to this rib is a flexible seal strip 43, having its free edge arranged to ride over the substrata 44 of the cake 45 formed and carried on the filter medium 8.

Mounted on the trough sides 38 and 39 are bearings 46 and 47, and journaled in these bearings is a shaft 48. Keyed to the left end of the shaft 48 as viewed in Fig. 1 is a sprocket wheel 49 driven through a chain 51 by a sprocket 52 mounted on a shaft 53. The shaft 53 is carried and driven by a gear head motor 54 mounted on one corner of the frame 36. Mounted on the shaft 48 are three longitudinally spaced spiders 55, 56 and 57, and fastened to the peripheries of these spiders are a plurality of peripherally spaced and longitudinally extending vanes or paddles 58, this assembly constituting a paddle wheel discharger arranged to rotate with positive clearance immediately above the arcuate lip 41. As best shown in Fig. 3, the free end of the lip 41 serves to cut off the upper strata of the cake 45 as the cake rotates into this lip and the paddle wheel discharger functions to move increments of the upper strata of the cake upwardly along the inclined surface of the lip 41 into the trough 37. Preferably the trough 37 slopes outwardly and downwardly so that the cake delivered to it by the paddle wheel discharger will flow outward radially into a chute 59 associated with the outer side 38 of the trough.

Supported over the pan 1 at the feed station thereof is a feed distributor 61 which can be supported either from the stationary frame of the filter or suspended from a portion of the building in which the filter is installed.

The valve body 17 is divided by radial webs 62 into a plurality of independent ports or compartments 63, 64, 65 and 66, the radial webs 62 terminating at their inner ends in a hub 67. Formed on the upper surface of the valve body 17 is a channel 68 arranged to overlie and register with the holes 16 in the wear plate 15. Seated within the channel 68 over the compartment 63 are a pair of spaced valve bridges 69 and 71, the exposed faces of which are flush with the outer face of the valve body 17. As the wear plate 15 rotates over the upper surface of the valve body 17 each of the holes 16 travels in registration with the channel 68 but is blanked off periodically as it passes over the bridges 69 and 71.

Seated over the lower face of the valve body 17 is a valve cap 72 provided with openings therein corresponding to the compartments 63, 64, 65 and 66. One of these openings communicates with a fitting 73 arranged to be connected with a source of reverse pressure, and through the valve cap 72 with the compartment 63. Also provided on the valve cap 72 is a flexible connection 74 arranged to establish communication between a suitable source of vacuum and one or more of the compartments 64, 65 and 66. The purpose of having the compartments 64, 65 and 66 is to permit a segregation of the cloudy and clear filtrates and wash water if that should be desired in the cycle of operation of the filter. In the particular instance, the compartments 64, 65 and 66 may be considered as a single compartment through which each of the filtrate compartments 12 is successively subjected to a subatmospheric pressure during the pick-up cycle of the filter. The valve cap 72 is bolted to the valve body 17 and this assembly is held in its operative position against the wear plate 15 by a valve stem 75. Surrounding the outer end of the valve stem is a spring 76 and abutting the outer end of this spring is a ring 77. Threaded over the outer end of the stem 75 is a double lock nut 78.

This valve is of standard construction used extensively on continuous filters of various types, and differs from other valves of this general type only in the specific way in which it is bridged. Its cycle of operation is diagrammatically indicated in Fig. 4. Each filtrate compartment 12 is maintained under a vacuum during the entire cycle of operation of the filter except at three points. As each hole 16 of the wear plate 15 passes over the first bridge 69, the vacuum on the corresponding filtrate compartment is cut off, this compartment then being under neutral pressure with the exception of the action of gravity. When this hole passes over the space between the bridges 69 and 71 the corresponding filtrate compartment 12 is subjected to a reverse pressure or blow-back until the hole in question is blanked off by the second bridge 71. At this point the corresponding filtrate compartment 12 is again under neutral pressure until the hole 16 is again placed in communication with the channel 68. As indicated in Fig. 4, the reverse pressure or blow-back referred to is applied during the intermediate stage of the feed cycle. The application of the blow at this point is of particular importance for, as diagrammatically indicated in Fig. 5, it serves to belly outwardly the filter medium over the filtrate compartment in question so as to break up the lower strata of cake carried thereon. Since simultaneously slurry is being fed to the filter medium at this point, the combined action of the flow of slurry and the blow-back operates to disintegrate and re-pulp the residual cake carried on the filter medium. By resorting to this expedient the blinding or plugging of the filter medium is avoided. After each compartment passes the feed station it is subjected to a subatmospheric pressure so as to form a relatively thick or heavy cake, the upper strata of this cake being continuously cut off by the leading edge of the lip 41 as previously described.

I claim:

1. A filter comprising: a filter section arranged to travel in a closed path through a feed zone, a cake forming zone and a cake discharge zone; cake discharge means located at said discharge zone immediately adjacent said filter section for removing all cake formed on said section except a relatively thin substrata thereof; slurry feeding means located at said feed zone over said closed path for flowing slurry over said substrata; means including an automatic filter valve connected to said section for subjecting said section to an outwardly directed fluid pressure during an intermediate portion of the feed cycle of said section thereby to disintegrate the substrata of cake carried thereon and to admix said disintegrated cake with said slurry; and means including said automatic valve for subjecting said section to a differential filtering pressure during the time that it passes through said cake forming zone.

2. A filter comprising: a rotary table formed by a plurality of contiguous filtrate compartments each covered with a filter medium and each communicating with a common automatic filter valve; a slurry feeder located over said table for flowing slurry over a predetermined portion of said table; means including said valve for subjecting each of said compartments successively to an outwardly directed differential pressure during an intermediate portion of the time that said slurry is being flowed thereon; means including said automatic valve for successively subjecting each of said compartments to a differential filtering pressure after said slurry has been flowed thereon so as to form a layer of cake thereon, and a cake discharger located over said table for removing successively from each of said compartments all but a substrata of the cake deposited and formed thereon.

3. The method of operating a filter wherein a filter section is arranged to travel in a closed path through a slurry feed zone, a cake forming zone and a discharge zone comprising: feeding slurry to said section at said feed zone first under the influence of a substantially zero differential pressure, then under the influence of an outwardly directed pressure, and finally under the influence of a substantially zero differential pressure; filtering said slurry in said cake forming zone under the influence of a substantial differential filtering pressure so as to form a layer of cake on said section; and then removing the major portion of said cake from said section to complete the cycle of operations.

4. The method of operating a filter wherein a filter section is arranged to travel in a closed path through a feed zone, a cake forming zone and a cake discharge zone comprising: feeding slurry to said filter section while said section is under the influence of a differential filtering pressure so as to form on said section a cake of substantial thickness; removing from said section all of the cake formed thereon except the lower strata thereof; feeding slurry to said section at said feed zone over the said lower strata of cake retained thereon; and subjecting said section during a portion of its travel through said feed zone to an outwardly directed pressure thereby to disintegrate and re-pulp said lower strata of cake with said slurry.

CHAS. FUHRMEISTER, Jr.

REFERENCES CITED

The following references are of record in the file of this patent:

UNITED STATES PATENTS

| Number | Name | Date |
| --- | --- | --- |
| 165,637 | Watson et al. | July 13, 1875 |
| 768,094 | Turner | Aug. 23, 1904 |
| 1,335,695 | Oliver | Mar. 30, 1920 |
| 1,868,883 | Campbell | July 26, 1932 |
| 2,027,652 | Raisch | Jan. 14, 1936 |
| 2,102,780 | Bielfeldt | Dec. 21, 1937 |
| 2,289,762 | Duvall | July 14, 1942 |

FOREIGN PATENTS

| Number | Country | Date |
| --- | --- | --- |
| 2,815 | Great Britain | 1908 |
| 3,734 | Great Britain | 1872 |